United States Patent [19]

Morimoto et al.

[11] Patent Number: 4,989,177
[45] Date of Patent: Jan. 29, 1991

[54] ATTACHMENT CONNECTABLE TO ELECTRONIC TRANSLATOR

[75] Inventors: Masafumi Morimoto, Yamatokoriyama; Kunio Yoshida; Tosaku Nakanishi, both of Nara, all of Japan

[73] Assignee: Sharp Kabushiki Kaisha, Osaka, Japan

[21] Appl. No.: 817,796

[22] Filed: Jan. 10, 1986

Related U.S. Application Data

[63] Continuation of Ser. No. 270,102, Jun. 3, 1981.

[30] Foreign Application Priority Data

Jun. 10, 1980 [JP] Japan .................................. 55-78559

[51] Int. Cl.[5] .............................................. G06F 15/38
[52] U.S. Cl. .................................... 364/900; 364/920.4
[58] Field of Search ................................ 364/200, 900

[56] References Cited

U.S. PATENT DOCUMENTS

| 3,932,859 | 1/1976 | Kyriadkides et al. | 364/900 |
| 4,158,236 | 6/1979 | Levy | 364/900 |
| 4,159,536 | 6/1979 | Kehoe et al. | 364/900 |

FOREIGN PATENT DOCUMENTS

| 1448211 | 9/1976 | United Kingdom . |
| 2014765 | 8/1979 | United Kingdom . |

Primary Examiner—Dale M. Shaw
Assistant Examiner—Michael A. Jaffe

[57] ABSTRACT

An electronic translator comprises a memory circuit for storing words which is removable from the translator, an attachment connectable to the translator, and a coupling device permitting either the memory circuit or the attachment to be connected to the translator. The coupling device is provided within the translator. The attachment may be a printer or an audible sound generator.

5 Claims, 7 Drawing Sheets

ATTACHMENT CONNECTABLE TO ELECTRONIC TRANSLATOR

This application is a continuation of application Ser. No. 270,102, filed on June 3, 1981.

BACKGROUND OF THE INVENTION

The present invention relates in general to a word information storage and retrieval device and, more particularly, to an electronic translator for providing efficient and rapid retrieval of any desired word or words stored therein.

Recently, a new type of electronic device called an electronic translator has been available on the market. The electronic translator differs from conventional types of electronic devices in that the former is of a unique structure which provides for efficient and rapid retrieval of word information stored in a memory.

To enhance operation of the electronic translator, it is desirable that an attachement, such as a printer for recording retrieved information from the electronic translator, be connectable to the electronic translator.

SUMMARY OF THE INVENTION

Accordingly, it is an object of the present invention to provide an improved electronic translator to which an attachment such as a printer or a voice synthesizer is connectable.

It is another object of the present invention to provide an improved electronic translator in which an attachment such as a printer or a voice synthesizer is connectable to a terminal of the electronic translator, and to which a memory for storing a plurality of words as data for generation is connectable.

Briefly described, an electronic translator of the present invention comprises a memory circuit for storing words, removable from the translator, an attachment connectable to the translator, and a coupling device permitting either the memory circuit or the attachment to be connectable to and compatible with the translator, the coupling device being provided within the translator. The attachment may be a printer or an audible sound generator.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

First of all, any kind of language can be applied to an electronic translator of the present invention. An input word is spelled in a specific language to obtain an equivalent word, or a translated word spelled in a different language corresponding thereto. The languages can be freely selected.

Figure 1:
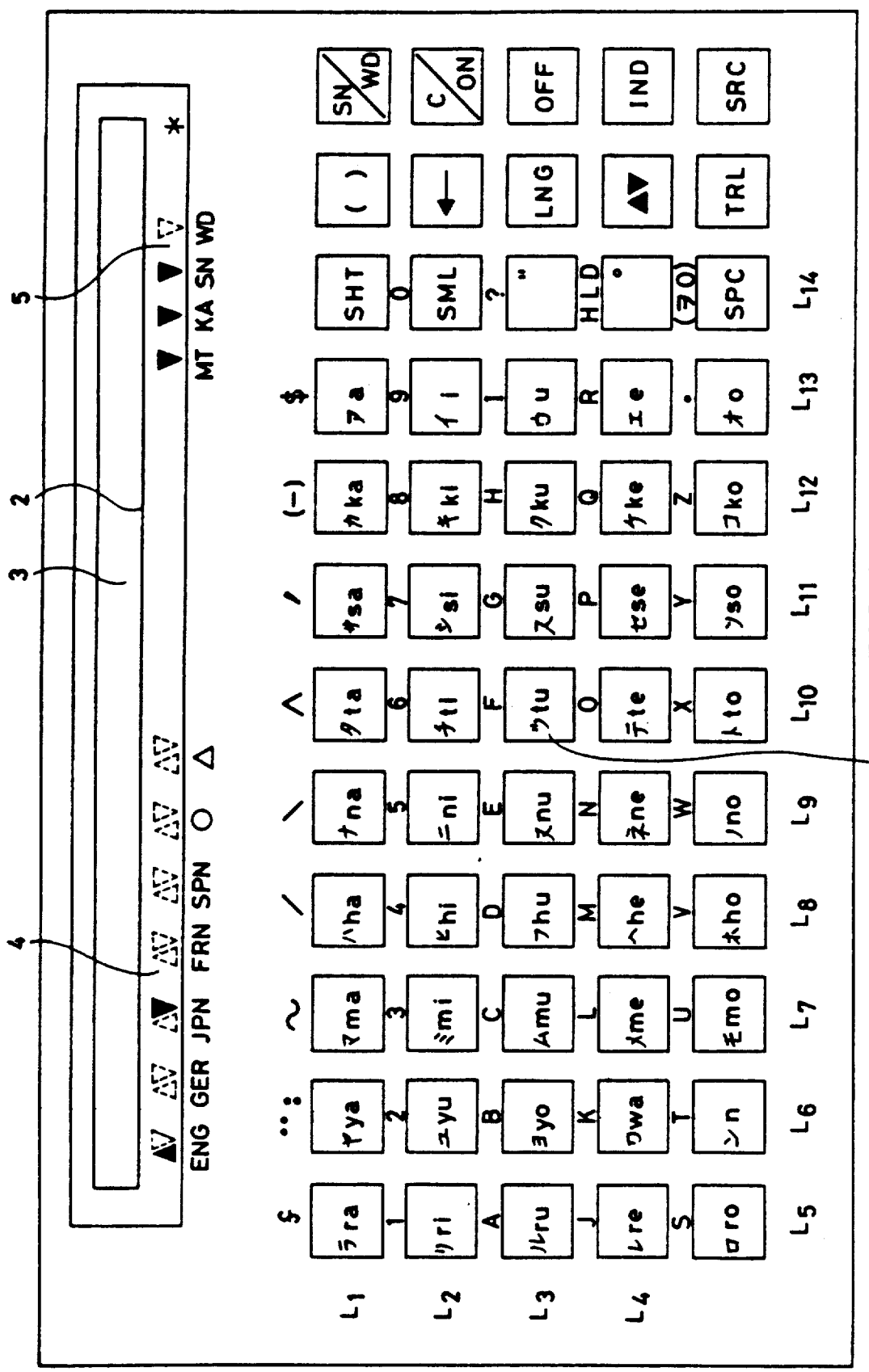
FIG. 1 shows a plan view of an electronic translator according to the present invention.

Referring now to FIG. 1, there is illustrated an electronic translator according to the present invention. The translator comprises a keyboard 1 containing a Japanese syllabery keyboard, an alphabetical keyboard, a symbol keyboard, and a functional keyboard, an indicator 2 including a character indicator or display 3, a language indicator 4 and a symbol indicator 5.

The character display 3 shows characters processed by this translator. The language indicator 4 shows symbols used for representing the mother tongue and the foreign language processed by the translator. The symbol indicator 5 shows symbols used for indicating operational conditions in this translator.

Figure 2:
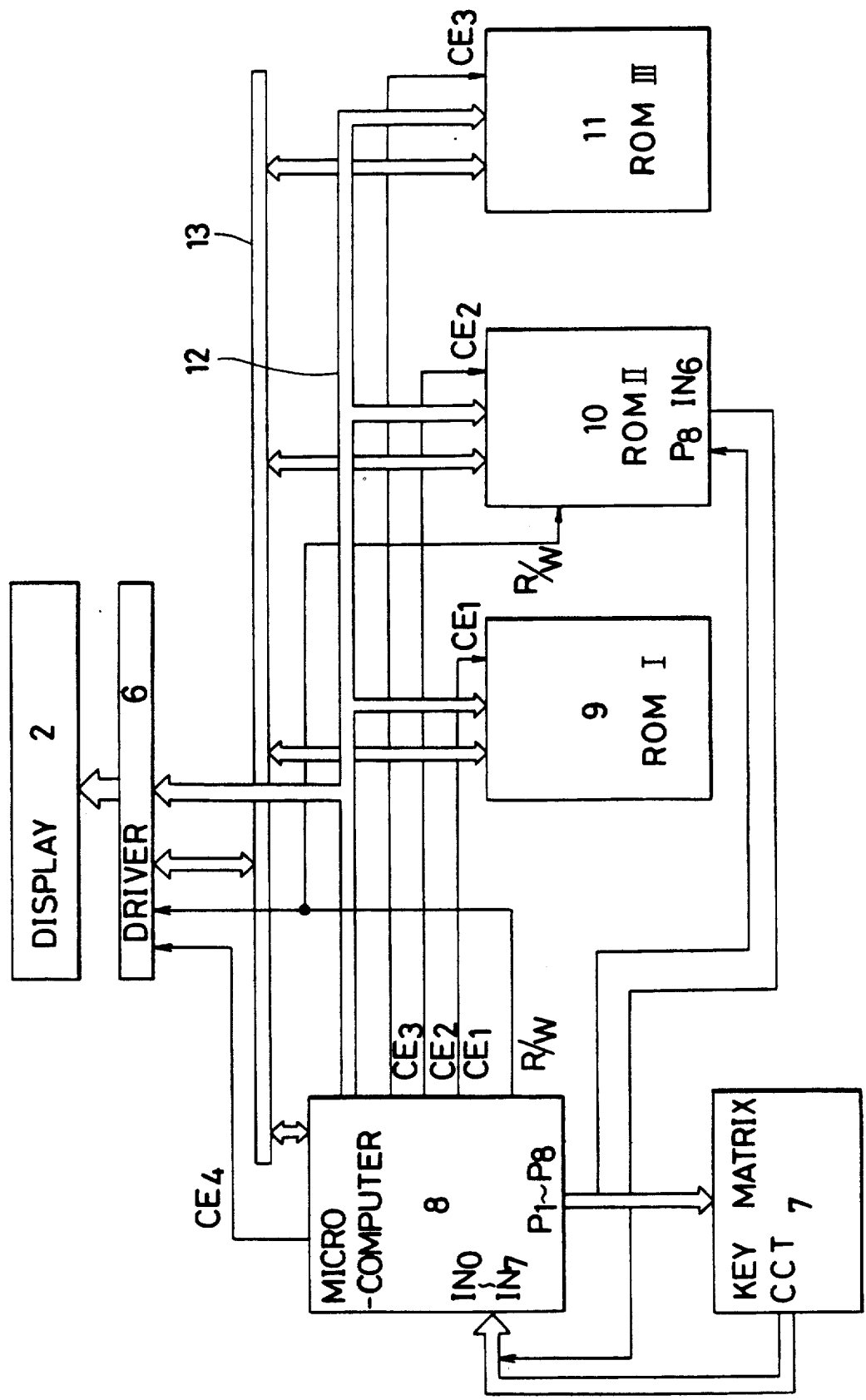
FIGS. 2, 3(a) and 3(b) show block diagrams of control circuits implemented within the translator as shown in FIG. 1.

FIG. 2 shows a block diagram of a control circuit implemented in the translator. The circuit comprises the display 2, a driver 6, a key matrix circuit 7, a microcomputer 8, a ROM I 9, a ROM II 10, and ROM III 11. The circuit 7 functions with the keyboard 1 of FIG. 1. The circuit 7 is connected to terminals P1 through P8 and IN0 through IN7 of the microcomputer 8. Each of the terminals denoted as P1 through P8 generates key strobe signals. Each of the terminals denoted as IN0 through IN7 receives key input signals.

Each of the ROMs 9 to 11 contains words and/or sentences used by the translator. One of the ROMs 9 to 11 corresponds to one kind of language. For example, the ROM I 9 stores a plurality of English words, the ROM II 10 stores a number of Japanese words and the ROM III 11 stores a number of German words. Preferably, the ROM I 9 is built in the translator so that it can not be removed from the translator for exchange purposes. However, each of the ROM II 10 and the ROM III 11 can be removed from the translator and replaced by another type of ROM as modules ① and ②.

Each of the ROMs 9 to 11 is connected to the microcomputer 8 through an address bus 12 and a data bus 13. Chip selection signals $CE_1$, $CE_2$ and $CE_3$ are developed by the microcomputer 8 to select one of the ROMs 9 to 11. Words and/or sentences are applied to the microcomputer 8 from the selected ROM. $CE_4$ indicates a chip selection signal for the driver 6. R/W indicates a read/write signal for selecting read or write operation.

Among the output terminals P1 through P8 for the key strobe signals, a line connected to P8 is coupled to terminals for the ROM II 10. Among the input terminals IN0 through IN7 for the key input signals, another line connected to IN6 is coupled to terminals for the ROM II 10.

Figure 3:
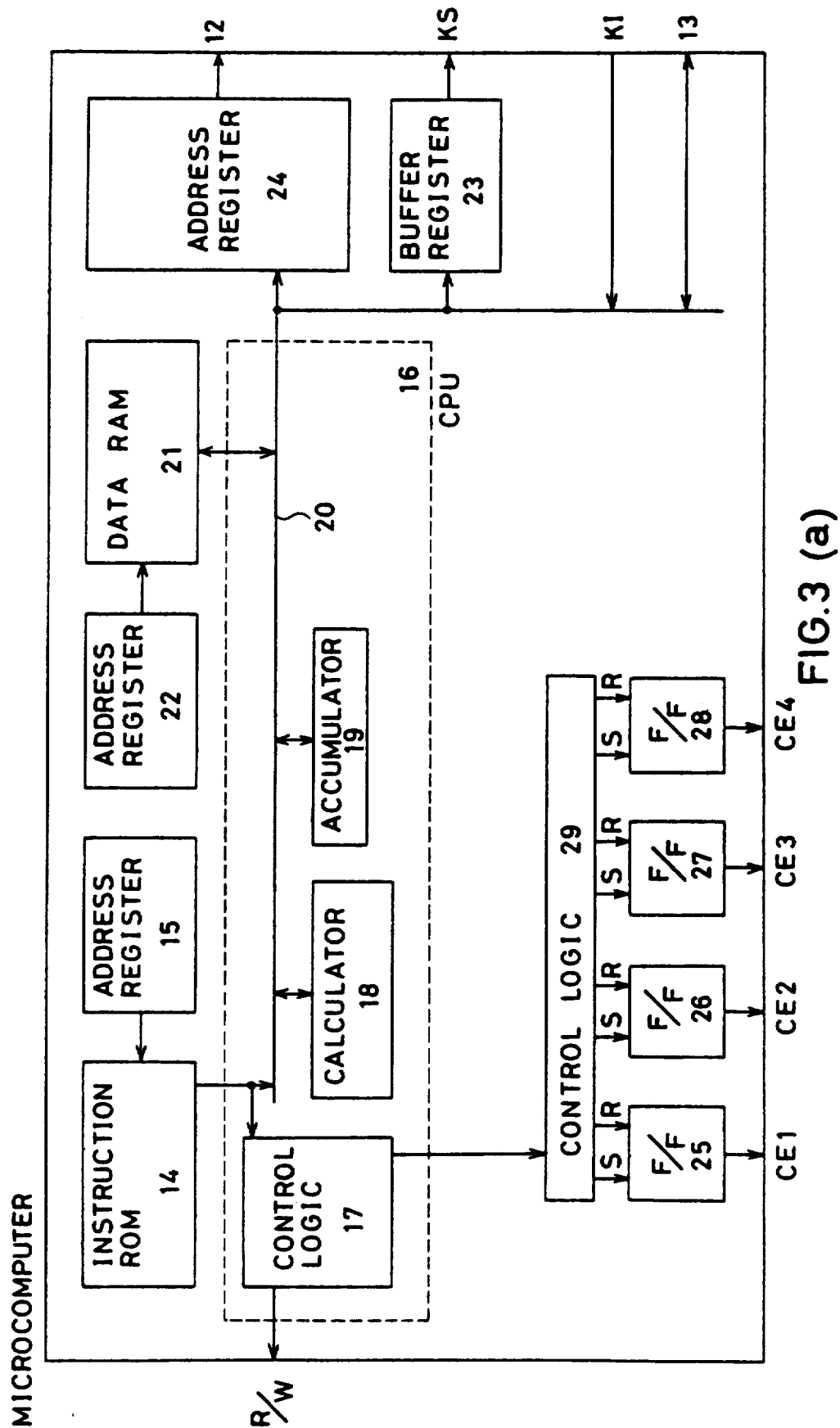
Figure 3:
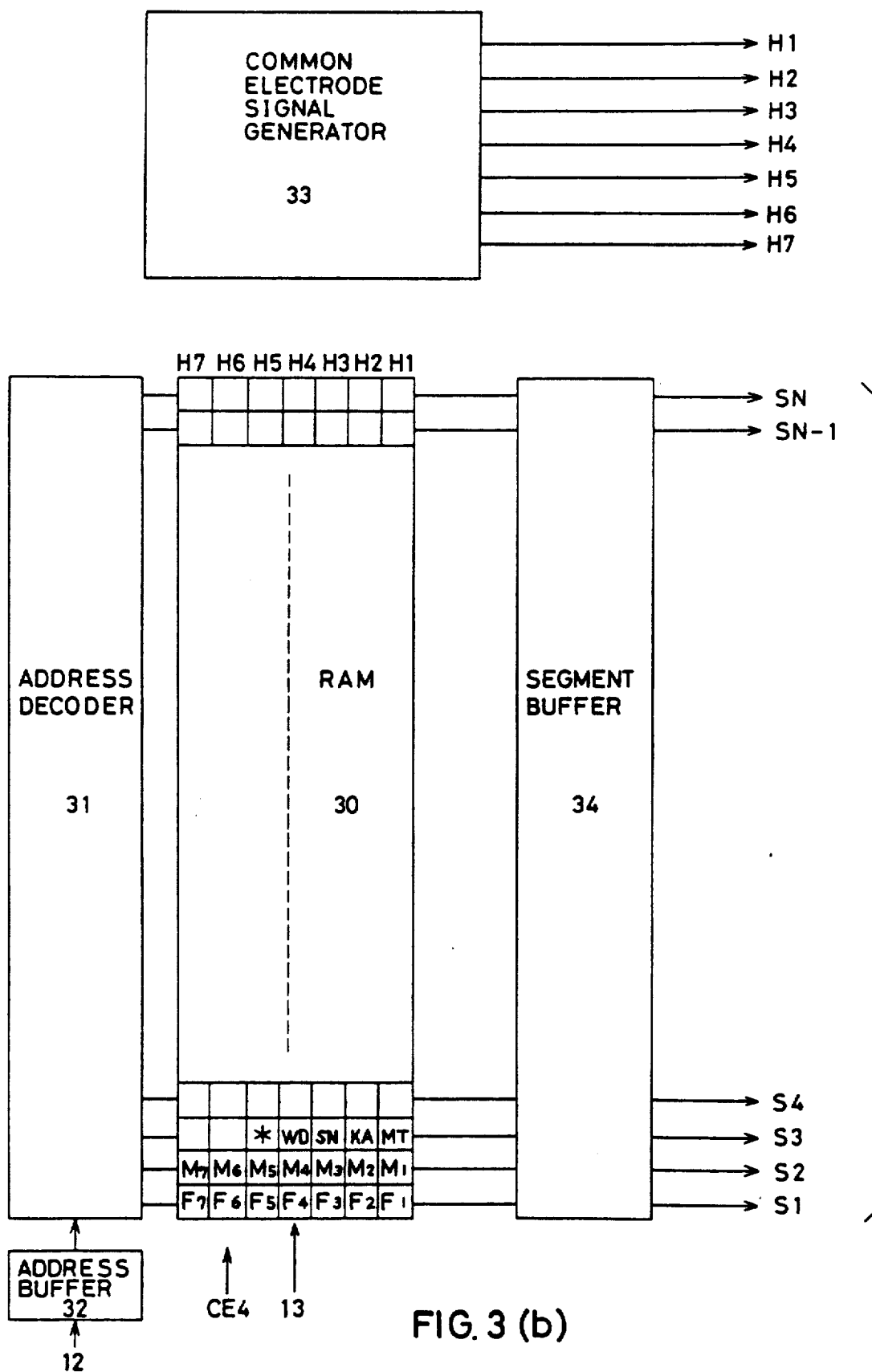

The ROM II 10 or the ROM III 11 can be replaced by an attachment such as a printer. In such a case, each of two printing instruction keys of the printer is coupled to the terminals P8 and IN6. Hence, when one of the two printing instruction keys is actuated, such information is applied and written by the microcomputer 8. FIG. 3(a) shows a block diagram of the microcomputer 8 of FIG. 2. An instruction ROM 14 stores a number of kinds of instruction each of which is used for a specific operation by the translator and is, preferably, in coded format. As the address of a ROM address register 15 is in turn advanced, the ROM 14 provides a specific kind of instruction. The specific instruction is applied to a CPU 16 so that the CPU 16 understands its instruction to provide its selected operation.

The CPU 16 comprises a control logic 17, a logic calculator 18, and an accumulator 19. An inner data bus is indicated by numeral 20. Data RAM 21 is provided for preliminarily containing data used for the translator and for functioning as a conditional flip flop used for a branch in a program operation. Data from the CPU 16 are stored in a specific location of the data RAM 21 which is selected by a RAM address register 22. The data stored in such a location of the RAM 21 are developed to the CPU 16.

Numeral 23 represents an output buffer register for outputting key strobe signals KS entered to the key matrix circuit 7 so that the output of this circuit 7 is applied to the CPU 16 as key input signals KI. Numeral 24 indicates an address register for selecting the address of the external memory including the ROMs 9 to 11 and a RAM circuit within the driver 6. The output of the address register 24 is fed through the address bus 12. Control of the address register 24 to select, increment or decrement a certain address is carried out by the CPU 16. Since the CPU 16 is coupled to the data bus 13 as shown in FIG. 2, transmission of the data between the CPU 16 and the external memory is conducted using the data bus 13. Direction of transmission of the data between them is defined with the read/write signal R/W.

Each of flip flop circuits 25 to 28 is set or reset by a control logic 29. The control logic 29 is controlled by the CPU 16. The output of the flip flops 25 to 28 are chip selection signals $CE_1$ to $CE_4$.

FIG. 3(b) shows a block diagram of the driver 6 of FIG. 2. According to a preferable form of the present invention, the display 2 comprises a liquid crystal display. The character indicator 3 is formed as a 5×7 dot matrix for each single digit. One symbol of the language indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the display 2. That is, when information of "1" is written in a certain bit of the RAM 30, a particular dot (segment) of the display 2 corresponding to the certain bit is indicated. When information of "0" is stored in a certain bit of the RAM 30, a particular dot (segment) of the display 2 corresponding to the bit is made dark.

In FIG. 3(b), $S_1$, $S_2$ and $S_3$ are segment electrode signals used for illuminating symbols. $S_4$ to $S_N$ are segment electrode signals used for indicating characters. $H_1$ to $H_7$ represent common electrode signals. $M_1$ to $M_7$ represents a symbol " ▲ " of the language indicator 4 (FIG. 1), this symbol indicating the mother tongue or the original tongue which is not to be translated with the translator of the present invention. $F_1$ to $F_7$ represent another symbol " | " of the same indicator 4, this symbol indicating the foreign language which is to be translated with the translator of the present invention.

Further in FIG. 3(b), numerals 1 to 7 as the suffix are referred to English, German, Japanese, French, Spanish, another language "○", and a further language "△", respectively corresponding to the indicators shown in FIG. 1. MT indicates a multivocal word. KA indicates a Japanese "Katakana" letter. SN represents a sentence while WD represents a word. A star "*" indicates that each of words represented in the mother tongue or the original tongue is translated to corresponding words represented in the foreign language while the grammatical correction and modification meeting with the foreign tongue is not carried out.

The driver 6 provides displaying signals to the display when displaying data are developed from the microcomputer to apply them to the RAM 30. Since the driver 6 is conventional, further description is omitted.

Figure 4A:
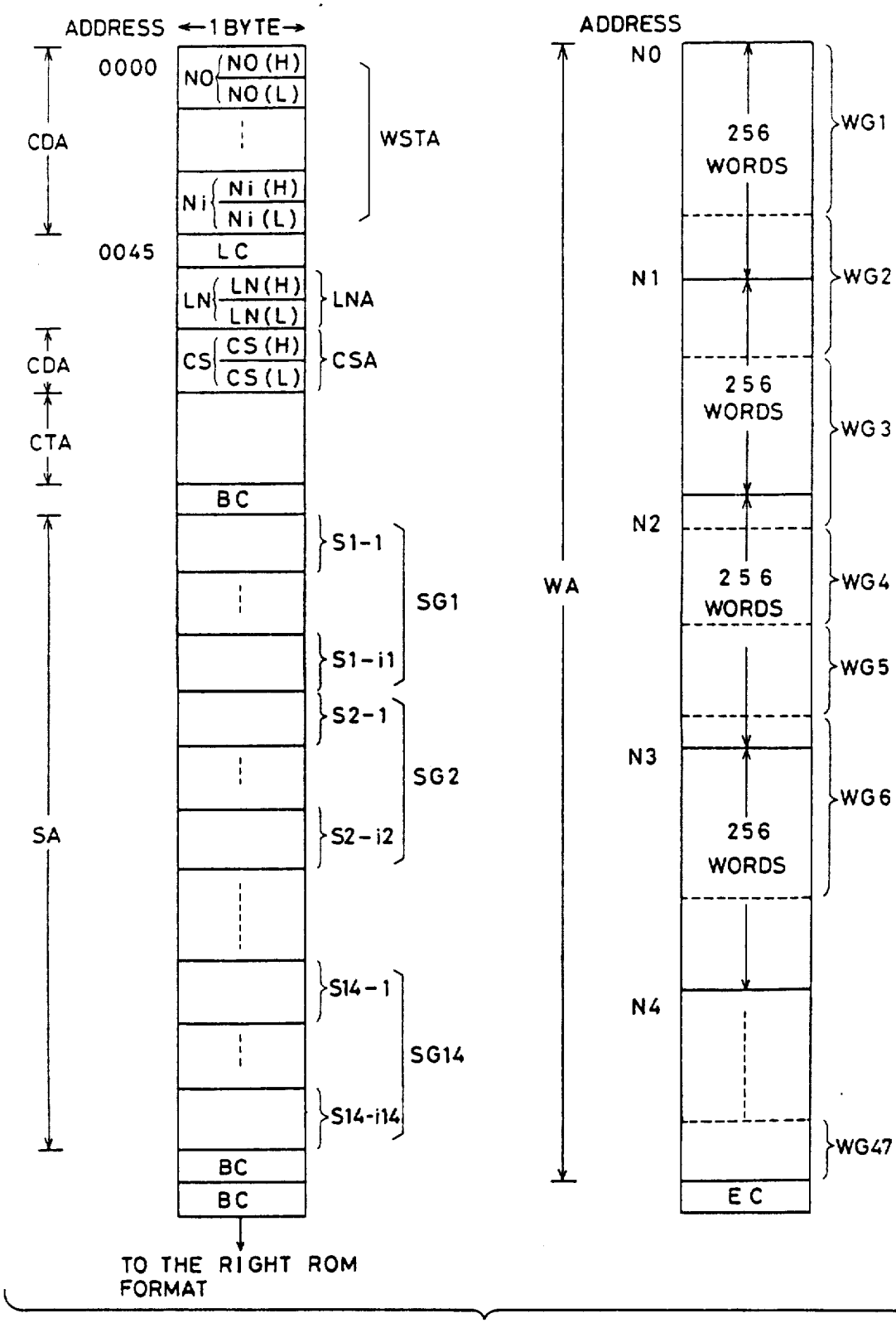
FIG. 4(a) shows a format of a ROM for storing words, the ROM being connected in the circuit of FIG. 2.

FIG. 4(a) shows a format in which a great number of words are stored in each of the ROMs 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency of occurrence of spelling of English words is determined to facilitate detection of some English words having a high frequency in of occurrence. The thus selected English spelling is changed to corresponding compression codes for storing purposes. The data-compression table CTA stores data for presenting correspondence between the selected spelling and the compression codes.

When correspondence between input words and one or more words stored in one of the ROMs is to be detected, the input word is changed to codes inclusive of one of the compression codes according to the contents of the data-compression table CTA since each of the ROMs stores codes which may include one of the compression codes. The table CTA is used to locate words stored in one of the ROMs by changing the codes to the original spelling. The nature of this table is different depending on the particular language to achieve the greatest possible degree of data compression.

Stored words are classified in 47 categories in each of which a number of words are ordered. In FIG. 4(a) a word category n is referred to as WGn. Sentences are formed by a combination of a plurality of stored words. These sentences are classified in 14 categories in each of which a number of sentences are ordered. In FIG. 4(a) a sentence category m is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows a relation between the serial number of the category and the name of the category.

TABLE 1-1

| The serial number of the category | corresponding key | the name of the category |
|---|---|---|
| 1 | "ra" or "8" | airplane |
| 2 | "ri" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category of words contains 256 words. A first word address table region WSTA contains a first address referred to $N_0, N_1, N_2, \ldots N_4$ in FIG. 4(a). This first address is related to a location in which first codes or first compressed code for representing the first word is stored. In accordance with a specific example of the present invention, each address is represented by two bytes. Each first address is separated to an upper byte referred to No(H) to Ni(H) and a lower byte referred to No(L) to Ni(L). The first word address table region is used to shorten retrieval time for a specific word.

CS is referred to a first sentence address CS(H) and CS(L) which is stored in a first sentence address region CSA. LNA indicates a memory location for storing a serial number of a word indicating the specific language as referred to LN of LN(H) and LN(L). More particularly, as the ROM storing English words is concerned, a word "English" is necessarily contained in that ROM. In such a case, the serial number of the words "English" in the ROM is LN starting from the first word of the same kind of word group. Storing the serial number LN is sufficient for showing the kind of the mother tongue and the foreign language being selected in the character indicator 3, and it is unnecessary to additionally store another indicator of the king of language.

The translator of the present invention may comprise audible sound generating means for developing words represented in the mother tongue and/or the foreign tongue. Since such an audible sound generating means is known and disclosed in, for example, Hyatt U.S. Pat. No. 4,060,848 issued Nov. 29, 1979, further description is omitted.

In FIG. 4(a), LC indicates a language code in which upper 4 bits indicate a field or topic stored in the ROM and lower 4 bits the language stored in the ROM. In particular, there may be present ROMs for storing words oriented to economy, engineering or medicine, respectively. Information representing such a field is stored in LC. The lower 4 bits corresponds to each language as follows:

TABLE 1-2

| The lower 4 bits | the language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | Spanish |
| 0 1 1 0 (6) | another tongue "○" |
| 0 1 1 1 (7) | a further tongue "❘" |

In FIG. 4(a) BC, "11111111" is a boundary code and EC "11111111" is an end code of the ROM.

Figure 4D:
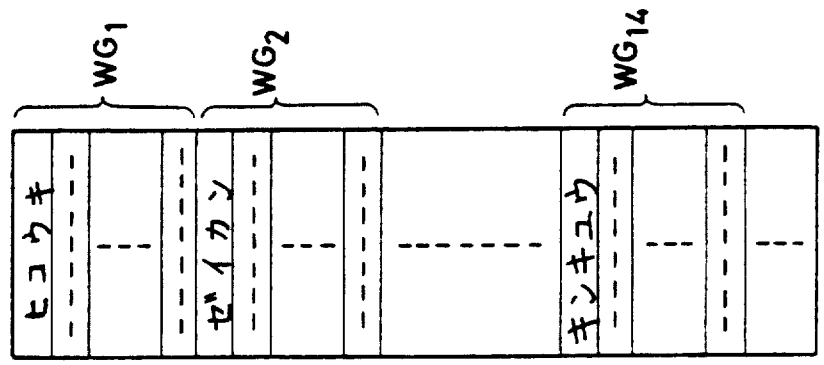
FIGS. 4(b) through 4(d) show formats of various types of ROMs connectable to the circuit of FIG. 2.
Figure 4C:
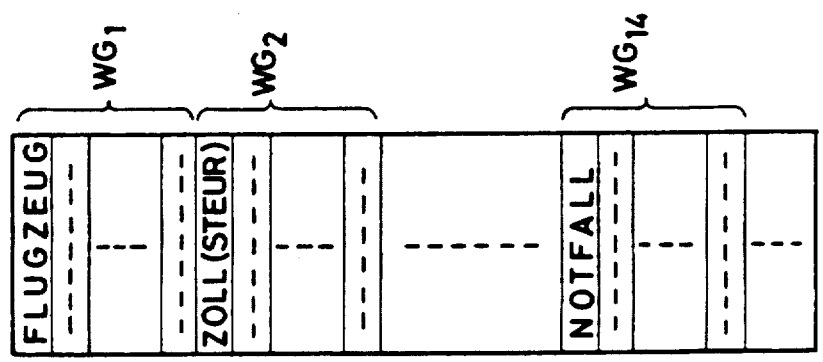
Figure 4B:
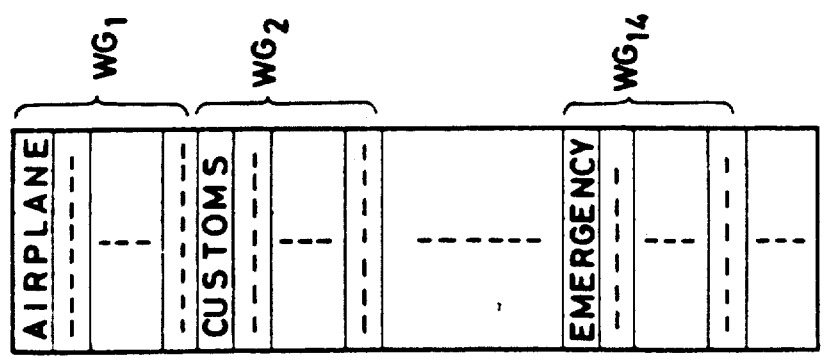

FIGS. 4(b) through 4(d) show formats of word categories in various types of ROMs containing English words, German words and Japanese words, respectively. A feature of these category words is that each first word stored in each category is the name of each category.

Figure 5:
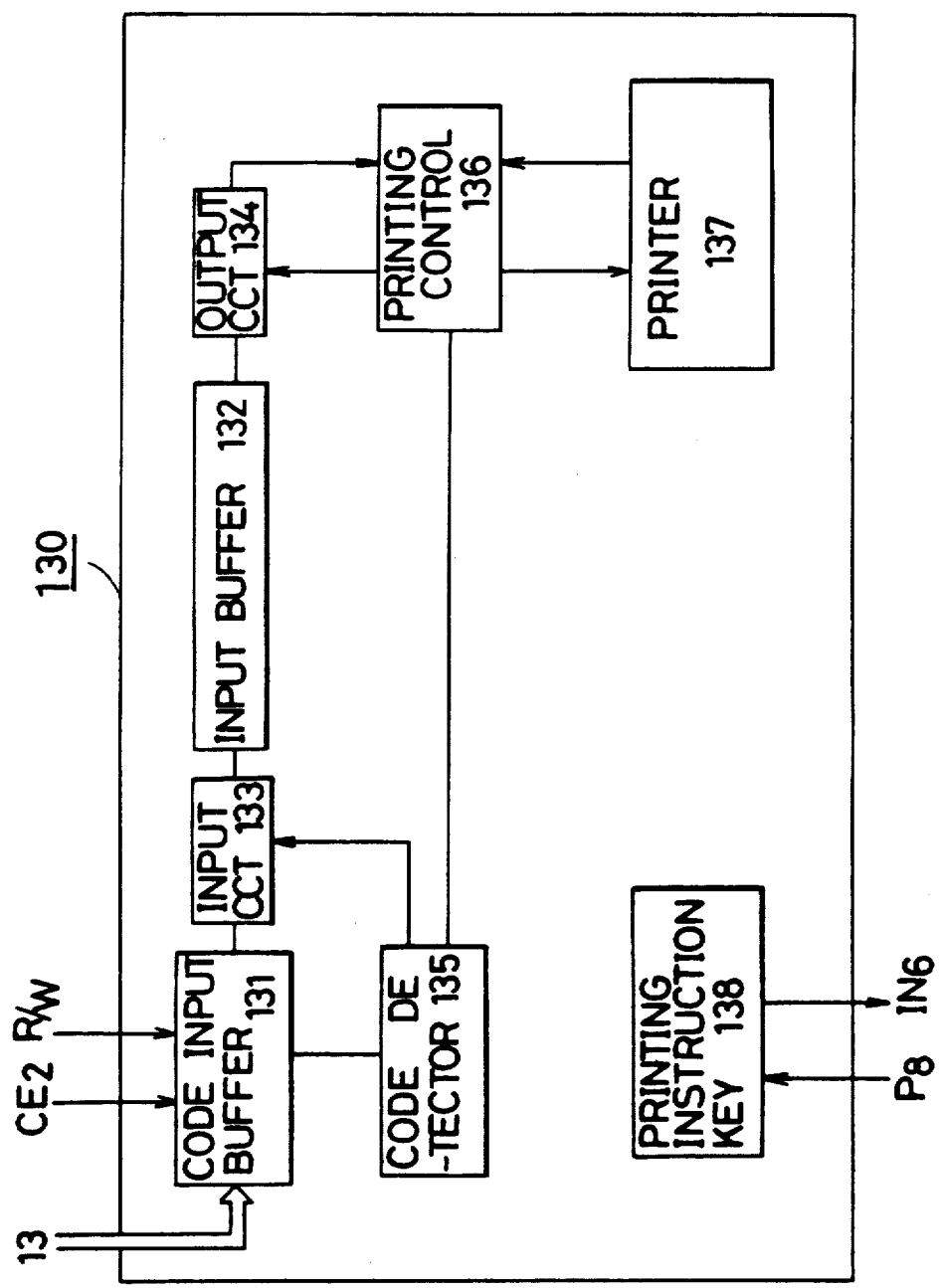
FIG. 5 shows a block diagram of an attachment containing a printer connectable to the electronic translator of FIG. 1.

FIG. 5 shows a block diagram of an attachment 130 containing a printer connectable to the electronic translator of FIG. 1. The attachment 130 comprises a code input buffer 131, an input buffer 132, an input circuit 133, an output circuit 134, a code detector 135, a printing control 136, a printer 137, and a printing instruction key 138.

The printing instruction key 138 may comprise a part of the key matrix circuit 7. When the key 138 is actuated, certain key input signals are applied to the input terminal IN6 in response to generation of the key strobe signals from the output terminal P8. Responsive to the input signals, the microcomputer 8 develops to the attachment 130 the contents of a certain buffer by a unit of a single letter. The contents of the certain buffer indicate retrieved information from a certain ROM. The retrieved information may be results of translation or the like. The contents of the certain buffer are transferred through the data bus 13.

That is, the read/write signal R/W and the chip selection signal CE2 are used to instruct that information is written in the attachment 130 connected to the terminals of the ROM 10 and that codes representing letters, symbol or so to be printed and printing control codes are developed to the code input buffer 131.

The code detector 135 is connected to the code input buffer 131 for detecting whether the codes applied to the code input buffer 131 represent the codes for letters, symbols, or so, or the printing control codes. When they are determined to be the codes for letters, symbols or so, the input circuit 133 sends the contents of the code input buffer 131 the input buffer 132.

When they are determined to be the printing control codes, the printing control 136 extracts in turn the codes for the letters, the symbols or so from the output circuit 134. The input circuit 133 functions as an input circuit for the input buffer 132. The output circuit 134 functions as an output circuit for the input buffer 132. The extracted codes for the letters, the symbols, or so are applied to the printer 137 to enable printing of the codes so as to record the retrieved information.

According to a preferred embodiment of the present invention, the printing instruction key 138 is provided within the attachment 130, separated from the keyboard 1.

The printing attachment 130 may be replaced by an audible sound generating means within the knowledge of one of ordinally skill in the art.

According to the present invention, the terminals for generating the read/write signal R/W and the terminals for inputting and outputting the key signals are provided at a connector for the ROM II 10. The terminals for the read/write signal R/W and for the key signals are combined with a connector of the attachment 130.

Within the body of the electronic translator, a memory is provided for memorizing a processing routine in which the codes indicating the letters, the symbols or so to be printed are transferred to the attachment 130 through the connector. The attachment 130 is connectable to the electronic translator by replacing the ROM II 10 with itself and by connecting the terminal of the attachment 130 with the terminal of the electronic translator to which one of the ROM II 10 can be connected.

The invention being thus described, it will be obvious that the same may be varied in many ways. Such variations are not to be regarded as a departure from the spiritn and scope of the invention, and all such modifications are intended to be included within the scope of the following claims.

What is claimed is:

1. An electronic translator wherein a first word or words represented in a first language are entered to obtain a second word or words represented in a second language equivalent in meaning to the first word or words, comprising:
    input means for entering the first word or words;

memory means comprising a plurality of memory components for storing the second word or words;

access means for addressing said memory means for retrieving the second word or words;

display means for displaying retrieved second words;

at least one of said memory components being selectively removable from said electronic translator;

a connector for facilitating selective connection or removal of said at least one memory component; and printing means for recording information retrieved from the electronic translator selectively removable from said electronic translator;

wherein said printing means is compatible with said connector whereby either said at least one memory component or said printing means is connected to said electronic translator via said connector.

2. The electronic translator of claim 1, wherein said connector comprises means for transmitting read/write signals for selecting a read or write operation for said memory means and a chip selection signal for selecting a particular one of said memory components.

3. The electronic translator of claim 1, wherein said printing out means comprises:

means for receiving information from said electronic translator;

means for detecting whether said information is data or control information; and means responsive to said detection means for outputting said information from said receiving means.

4. The electronic translator of claim 1, wherein said selectively removable printing means comprises print actuating switch means associated therewith.

5. The electronic translator of claim 1, wherein said connector comprises terminals compatible with both said at least one memory component and said printing means.

* * * * *